Sept. 27, 1960  H. P. BORIE, JR  2,953,798
SURFACE TREATING MACHINE
Filed May 28, 1956  6 Sheets-Sheet 1
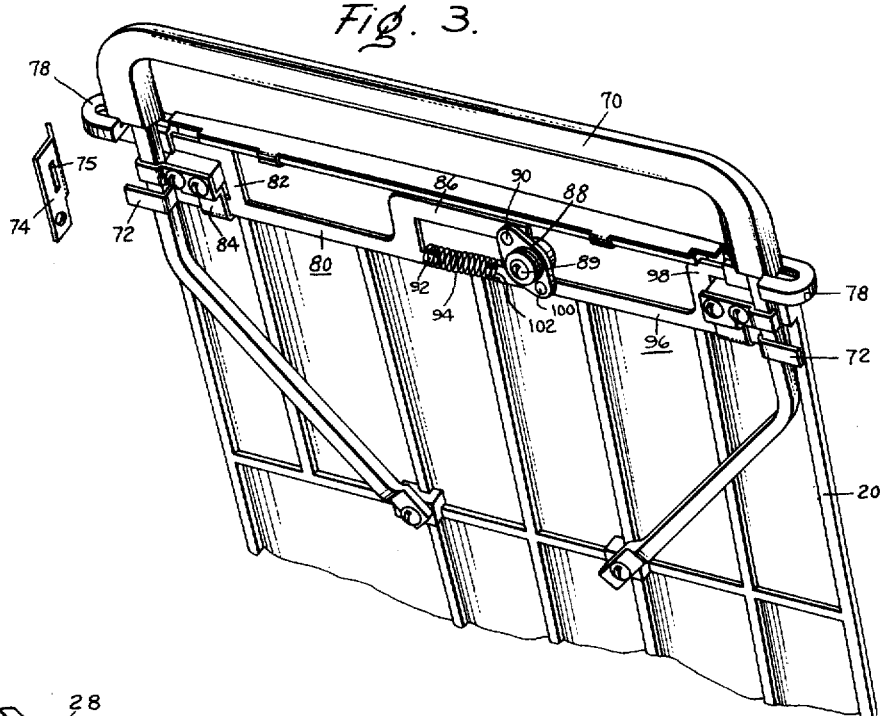
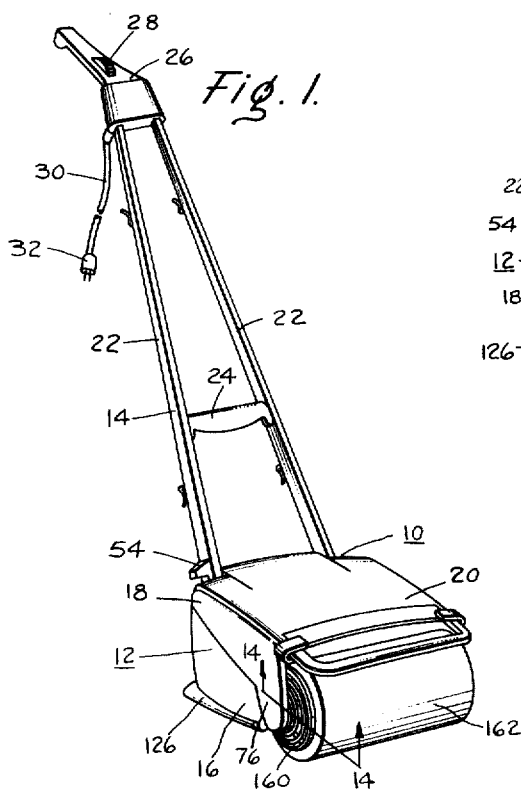
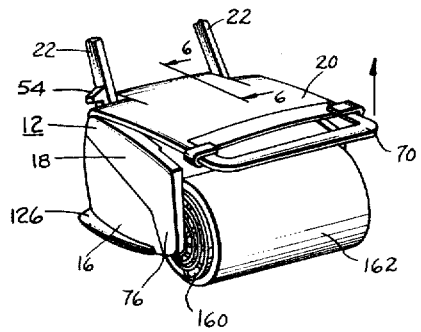
Inventor:
Henry P. Borie Jr.
by Armand Cifelli
His Attorney Inventor:
Henry P. Borie Jr.
by Armand Lelli
His Attorney.

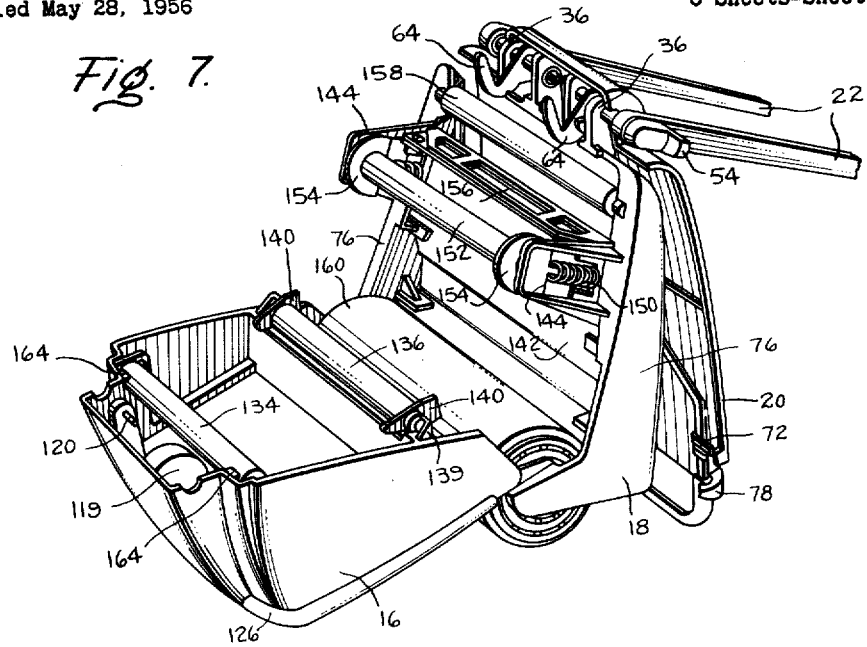

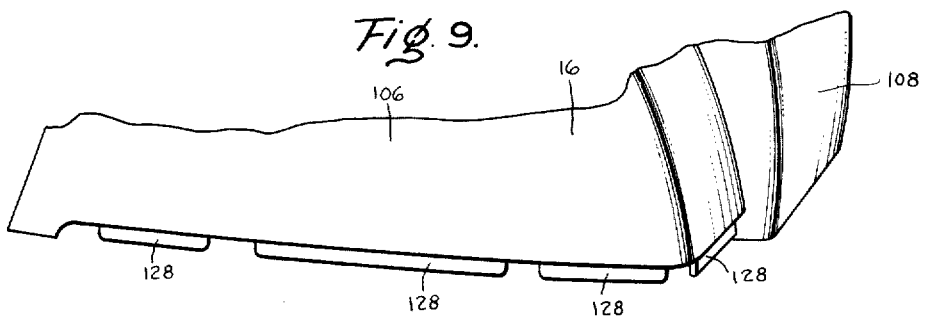
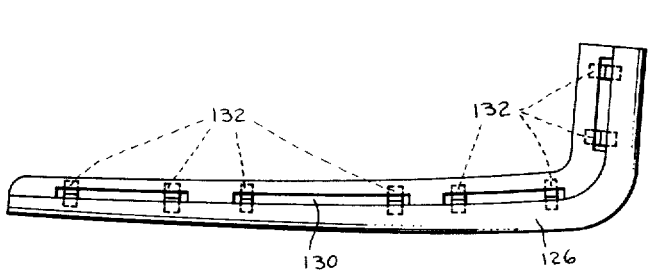
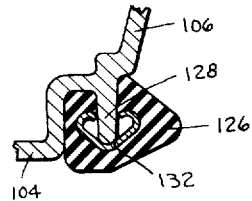
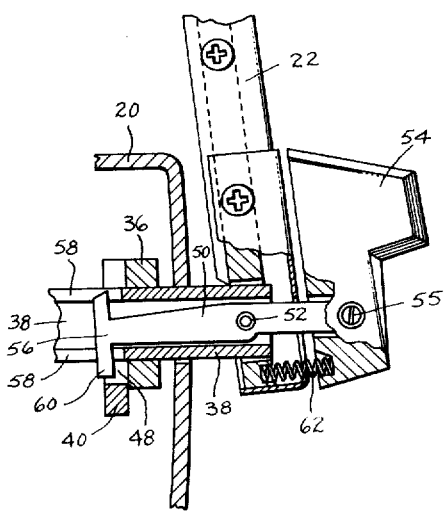
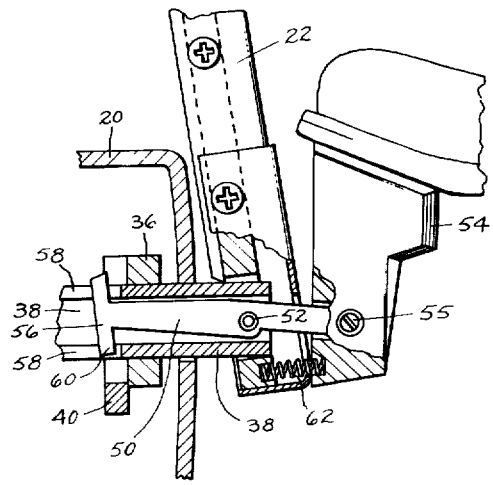
Inventor:
Henry P. Borie Jr.
by Edmund Cifelli
His Attorney Sept. 27, 1960 H. P. BORIE, JR 2,953,798
SURFACE TREATING MACHINE
Filed May 28, 1956 6 Sheets-Sheet 5

Inventor:
Henry P. Borie Jr.
by Armand Cifelli
His Attorney.

Sept. 27, 1960     H. P. BORIE, JR     2,953,798
SURFACE TREATING MACHINE
Filed May 28, 1956     6 Sheets-Sheet 6
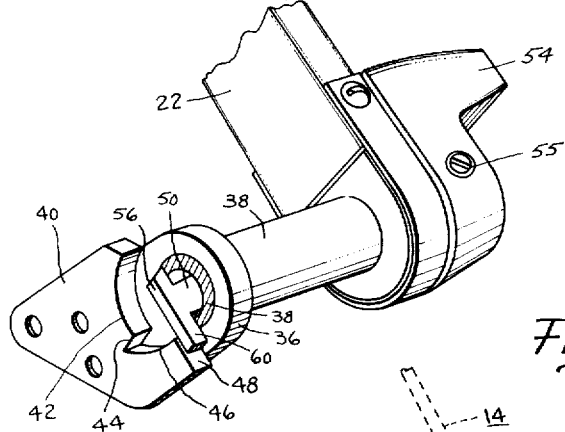
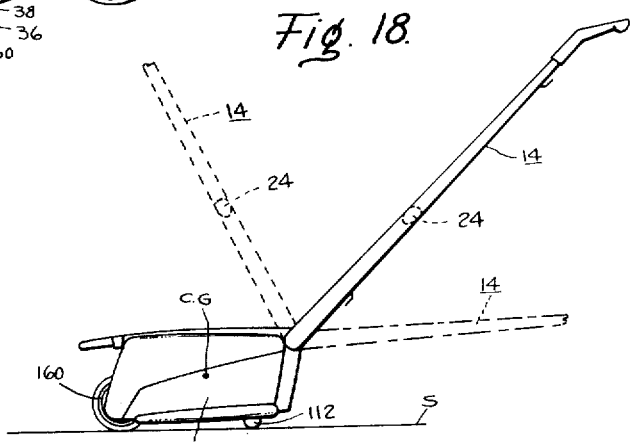
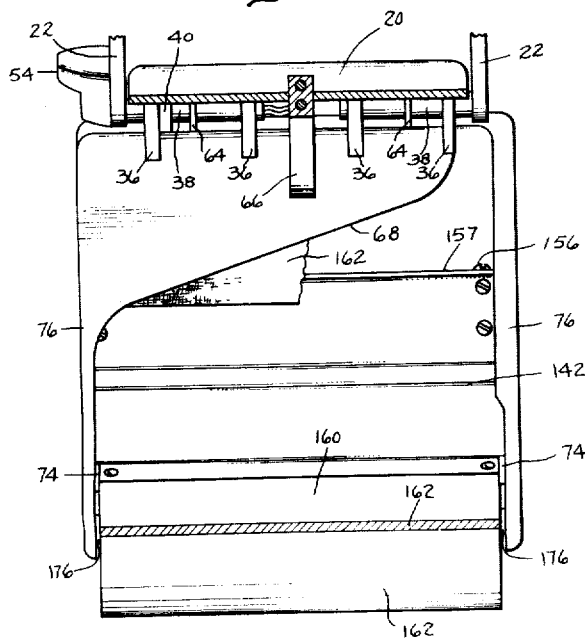
Inventor:
Henry P. Borie Jr.
by Armand Cifelli
His Attorney.

United States Patent Office 2,953,798
Patented Sept. 27, 1960

2,953,798
SURFACE TREATING MACHINE

Henry P. Borie, Jr., Cleveland Heights, Ohio, assignor to General Electric Company, a corporation of New York Filed May 28, 1956, Ser. No. 587,799
12 Claims. (Cl. 15—99)

My invention relates to electrically-operated floor treating machines, and particularly to those which are capable of scrubbing, wiping, oiling, waxing or polishing a floor, or a floor covering.

In recent years, more and more effort has been expended by industry to minimize the drudgery of the housewife by providing labor-saving devices which will perform many of the onerous chores that abound in the average home. One field which has received relatively little attention, or which has evaded successful conquest, is that of floor maintenance. Certainly there has been some effort expended in some areas of floor maintenance, and there are some methods and devices available for maintaining floors. For example, the widely used vacuum cleaner efficiently removes dirt and dust from floors and floor coverings. However, the problem of maintaining bare floors and certain types of floor coverings, such as the various tiles, which have to be cleaned and properly coated with a protective material has not been satisfactorily treated. There are numerous old and well-known ways of cleaning and/or waxing floors; scrubbing brushes, brooms, mops and the like will do the job, but they require a great deal of hard labor and suffer from certain functional difficulties, such as inability to pick up and dispose of dirt. More refined devices have been proposed for cleaning floors; some include endless cleaner belts which are pressed into contact with the floor and driven so as to clean and pick up dirt from the floor, then pass through a liquid where the dirt picked up is washed off, then pass through rollers where the liquid is squeezed out and then to be pressed into contact with the floor again. While this type of device affords some measure of relief and constitutes an improvement over the prior ones, there are numerous problems which attend its use. For example: (1) the assembly and disassembly of endless belts is difficult, (2) proper tracking of the belt is difficult to achieve, (3) proper squeezing of the belt and the consequent elimination of wet lines on the floor is difficult to achieve, (4) due to the unevenness of most floors, prior art devices often are unable to make their endless belts contact all portions of the floor and consequently the entire floor is not cleaned properly, and (5) prior art devices are not provided with light, detachable receptacles which can be carried to the sink for filling or cleaning; their liquid receptacles have to be filled with a hose or by a similar method and are difficult to clean.

It is an object of this invention generally to provide an improved electrically-operated, floor treating machine which is capable of scrubbing, wiping, oiling, waxing or polishing surfaces, such as floors or floor coverings, wherein an endless belt is employed and contacts the surface being treated, and particularly to provide an improved floor treating machine wherein the above enumerated deficiencies of prior art devices of this type are eliminated.

The object of this invention is achieved in one form and all of the deficiencies of the prior art are eliminated by providing in an electrically-operated, surface treating machine: and endless belt which makes contact with the surface and which is driven over a plurality of rollers so as to pass through a detachable receptacle which houses a material, the nature of which depends on the function the machine is to perform, i.e., scrubbing, polishing, wax applying, etc., and then through a plurality of squeezing rollers, means in addition to the squeezing rollers for removing excess material from the belt after it emerges from the material, additional means for wiping the edges of the belt, guiding means for insuring proper tracking of the belt, means to allow for irregularities in the surface being treated and a cantilevered mounting for most of the belt supporting portions of the machine which is adapted to be lifted off of the surface when the machine is disposed in a belt changing position to thereby allow for ready assembly and disassembly of the belt.

It should be clearly understood that the individual elimination of each of the enumerated deficiencies of the prior art devices is desirable and that the preceding paragraph describes a form of the invention which eliminates all of said deficiencies. Therefore, it is a separate and additional object of this invention to eliminate each of the above enumerated deficiencies individually. It will be apparent that all of the elements set forth in the preceding paragraph are not necessary to satisfy each of the separate and additional objects individually, and that various combinations of these elements will satisfy separate objects.

Other objects and further details of that which I believe to be novel and my invention will be clear from the following description and claims taken with the accompanying drawings wherein:

Fig. 1 is a perspective view of the improved surface treating machine.

Fig. 2 is a view similar to Fig. 1 of a portion of the machine showing its lid in opened position.

Fig. 3 is a fragmentary perspective view of the underside of the lid showing the lid latching mechanism.

Fig. 7 is fragmentary perspective view of the machine showing it in position after the lid is opened and a portion of the machine has been pivoted so as to expose the belt supporting, roller assembly and the bucket.

Fig. 8 is a view generally similar to Fig. 7 showing an endless belt partially mounted on the roller assembly.

Fig. 9 is a fragmentary perspective view of the bucket with the bumper guard removed.

Fig. 10 is an elevation view of one of the bumper guards.

Fig. 11 is a fragmentary sectional view showing the bumper guard mounted on the bucket.

Fig. 12 is a fragmentary elevation view with portions broken away and shown in section of the handle control mechanism in one position.

Fig. 13 is a view similar to Fig. 12 showing the pedal, which is a part of the handle control mechanism, actuated by a foot and the other parts adjusted to permit changing of the position of the handle.

Fig. 17 is a perspective view of the handle control mechanism showing one part thereof broken away and shown in section.

Fig. 18 is a schematic view of the machine showing the handle in the three principal positions which it may occupy.

Fig. 19 is a sectional view taken substantially on line 19—19 of Fig. 5.

Figure 4:
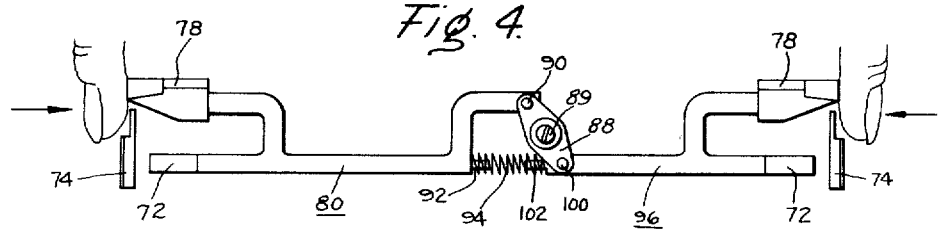
Fig. 4 is an elevation view of the lid latching mechanism per se.

Referring to the drawings and particularly to Fig. 1, it will be seen that the improved surface treating machine is designated generally by reference numeral 10 and primarily comprises a body 12, the handle 14 and an endless belt 162. The body generally comprises the bucket 16, the roller assembly 18 and the lid 20. The handle generally comprises a pair of spaced bars 22, lifting handle 24, and the hand grip 26. The hand grip includes a manually operable switch 28 and supports an electrical cord 30. The electrical cord has a conventional plug 32 at its free end, and its other end extends within the hand grip, through one of the bars 22 to the interior of the roller assembly 18 and ultimately to a motor which is mounted within the main roll 160, which is part of the roller assembly.

The handle 14 is pivotally connected to the body 12 and has a unique control mechanism which allows the handle to assume any one of three general positions relative to the body. In Fig. 18, the three positions are illustrated. When the handle is in the full line position it is disposed for normal operation (pushing or pulling) of the machine over a surface; in this position some relative pivoting between the handle and the body is permitted. In the dot-dash position, wherein the handle is essentially horizontal and parallel to the floor surface S, the handle is disposed so as to permit the body to be moved underneath furniture; in this position some limited relative pivoting between the handle and the body is also permitted. In the dotted position, the handle is inclined forward and it is in position for carrying the machine; in this position the lifting handle 24 is rigidly positoned relative to the body and, therefore, it may be gripped and the machine lifted off the surface. Note that in the latter position the lifting handle is substantially in line with the center of gravity CG of the machine.

The handle 14 is locked in its carrying position, and it is locked in its normal operating position to the extent that it may not be moved to its underneath furniture position, although it may be moved from its normal operating position to its carrying position; when in either of the locked positions which it may assume, it is necessary to actuate a control mechanism to unlock the handle before it may be moved. Stated differently, as viewed in Fig. 18, the handle may be moved, position-wise, in a counterclockwise direction without actuating a control mechanism, however, when changing positions in a clockwise direction, it is necessary to actuate the control mechanism. This arrangement is functionally desirable, as will become apparent.

The handle mounting and control mechanism will now be described. By reference to Fig. 8, it will be seen that the lower portions of the bars 22 are pivotally connected to the rear of the body 10. These connections are made between the tabs 36, which are formed on the rearward portion of the roller assembly 18, and a pair of tubes 38 which are rigidly connected to the lower ends of the bars 22 and which pass through appropriate openings in the lid 20 and the tabs 36 and extend toward each other.

The tubes have conventional locking means secured at their inner free ends. As illustrated, there are four tabs, and each tube passes through two tabs. The connections are such that the handle 14 is pivotal relative to the lid 20 and roller assembly 18 unless restrained by the handle control mechanism.

The details of the handle control mechanism are shown in Figs. 12, 13 and 17. Secured to one of the tabs 36 (the right-hand tab in Figs. 7 and 8) is a cam 40. The cam has a cam surface which includes the arcuate surface 42, a first stop face 44, a second arcuate surface 46, and a second stop face 48. Disposed within the tube 38 that is adjacent to the cam 40 is a foot lever 50 which is pivotally mounted within said tube on the pivot pin 52. One end of the foot lever extends out through the tube and through the lower portion of one of the bars 22, and has a foot pedal 54 rigidly connected to its free end, as by securing means 55. The other end of the foot lever 50 has a T-shaped head 56 formed thereon. The oppositely extending portions of the T project through a pair of oppositely disposed slots 58 formed in the tube. One portion 60 of the T-shaped head cooperates with the cam 40 to control the position of the handle relative to the body.

Disposed between the lower ends of the foot pedal 54 and its associated handle bar 22, and received in appropriate sockets formed therein, is the compression spring 62 (see Figs. 12 and 13). The compression spring normally urges the foot pedal 54 in a counterclockwise direction relative to the pivot pin 52, and thereby urges the portion 60 of the T-shaped head downwardly, as shown in Figs. 12 and 13. When the portion 60 is disposed so as to contact the stop 48 on the cam (see Fig. 17), the handle is in the carrying position, and movement of the handle relative to the body is restrained by the interference between the portion 60 and the stop face 48.

In order to adjust the handle position from its carrying position to its normal operating position, as was previously mentioned, the control mechanism must be actuated, specifically, the foot pedal 54 must be depressed, as illustrated in Fig. 13. On depressing, the foot pedal is moved clockwise about the pivot pin 52 and the compression spring 62 is compressed. Movement of the foot pedal in this manner causes the T-shaped head 56 to move clockwise about the pivot pin 52, having the relative effect of moving the portion 60 upwardly and withdrawing it within the confines of the tube. Rotation of the tube relative to the cam 40 is now possible and consequently the handle may be rotated relative to the body to change its position. If it is desired to have the handle in its normal operating position, the foot pedal is released as soon as the stop face 48 is cleared, and the portion 60 is allowed to ride on the arcuate surface 46 until it contacts the stop face 44. When the portion 60 rides on the surface 46, it is in the operating position and it will, therefore, be seen that some relative movement between the handle and the body is permitted, because the portion 60 may move on the surface 46 between the stop face 44 and the stop face 48. If during such movement the portion 60 passes beyond the stop face 48, it will be urged radially outwardly by compression spring 62, and the handle will then be in its carrying position. This is a functionally desirable condition, for when it is desired to leave the machine temporarily during its normal operating use, the user simply pushes the handle forward to the dotted position shown in Fig. 18, and this causes the portion 60 to pass beyond stop face 48 and this results in the handle being moved to and locked in its carrying position without the necessity of depressing the foot pedal.

Assuming that the portion 60 is riding on the surface 46 and, therefore, the handle is in the normal operating position, and it is desired to push the body under a low piece of furniture, the foot pedal 54 must be depressed, thus withdrawing the portion 60 from contact with the surface 46 sufficiently to clear the stop face 44. When this is done, the tube may be rotated relative to the cam 40 until the portion 60 clears the stop face 44 and rides on the arcuate surface 42. In this position, the handle is substantially horizontal, as is shown in the dot-dash lines in Fig. 18, and the body may be pushed under low furniture. In the underneath furniture position, some limited, relative movement between the handle and body is allowed, for the portion 60 may ride on the surface 42. However, if the portion 60 moves beyond the stop face 44, it will be urged radially outwardly by the compression spring 62, and the handle will then be in the normal operating position therefore, it will be apparent that the handle may be moved from its underneath furniture position to its normal operating position without depressing the foot pedal. This is functionally desirable, for during use of the machine the handle is normally retained in the underneath furniture position only temporarily, and it is convenient to be able to move from this position to normal operating position without depressing the foot pedal.

In view of the foregoing, it should be apparent that a handle control mechanism has been provided which enables the handle to be selectively disposed in any one of three general positions, and that, as was previously mentioned, the handle may be moved from any position counterclockwise (as viewed in Fig. 18) to another position, i.e., from underneath furniture position to normal operating position, and from the latter to carrying position, without actuating the control mechanism. However, when changing positions clockwise, it is necessary to depress the foot pedal. As was pointed out, this is functionally desirable, for in order to make clockwise position changes, the control mechanism requires an intentional act on the part of the operator, and inadvertent clockwise position changes, which are undesirable, are thereby avoided. Inadvertent, clockwise positions are undesirable, because the handle must be rigidly connected to the body when in its carrying position or carrying is very difficult, and inadvertent movement of the handle from normal operating position to underneath furniture position should be avoided in order to provide for easy movement of the machine for long distances, as will be described in the next paragraph.

The handle control mechanism also provides an arrangement for readily moving the machine a considerable distance, let us say from room to room, with the body out of contact with the surface. To accomplish this, the handle is moved to normal operating position and it is lowered (moved clockwise as viewed in Fig. 18) without depressing the foot pedal. The portion 60 contacts the stop face 44, and further lowering of the handle causes the body to pivot on wheels 112 (to be subsequently described) located below its rearward end, and thereby raise its front end off the surface S so that the machine may be readily rolled over the surface on the wheels.

Figure 5:
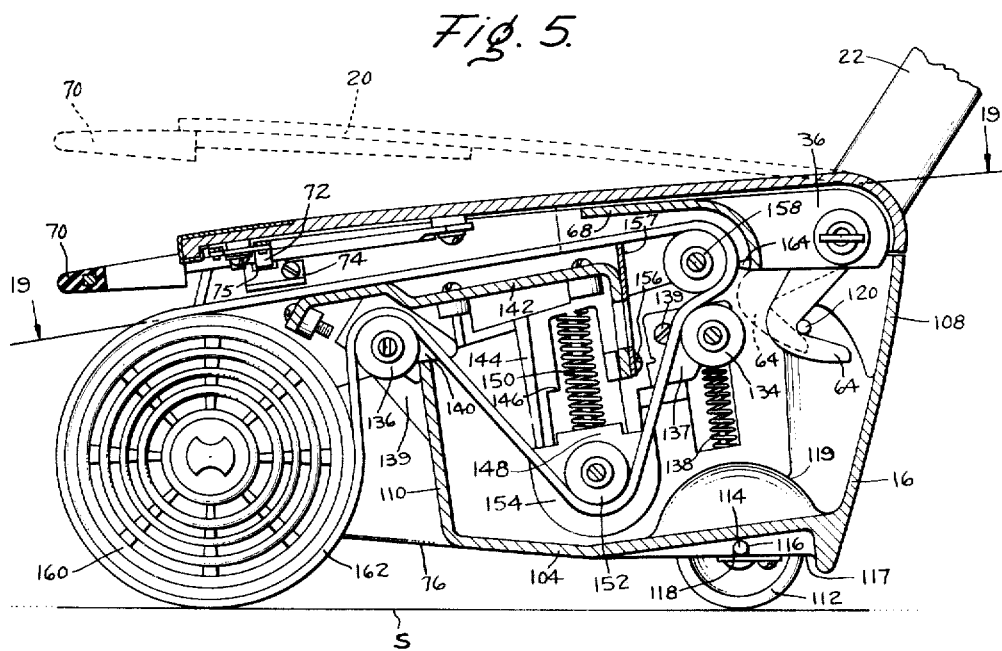
Fig. 5 is a sectional view taken in a longitudinal plane passing through the body of the machine, showing the lid in the two principal positions it may occupy, i.e., closed position in solid lines and opened position in dotted lines.
Figure 6:
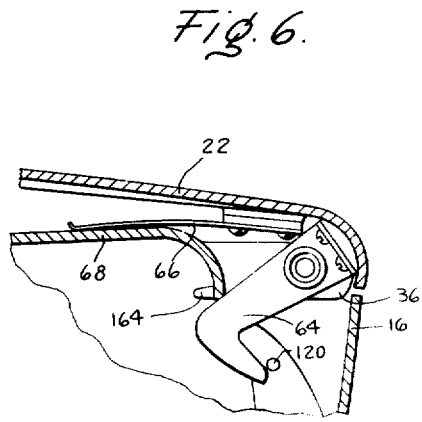
Fig. 6 is a fragmentary sectional view taken on line 6—6 of Fig. 2.

The body, as was previously stated, comprises the bucket 16, the roller assembly 18 and the lid 20, which are the three major elements of the body. The manner in which these elements are constructed, assembled and cooperate can best be seen in Figs. 7, 8 and 15. From these figures it will be observed that the lid 20 is pivotally attached at its rearward side to the rearward side of the roller assembly 18. The actual connection is effected by a pair of hooked members 64 which are rigidly secured to the rear of the lid 20 and which have apertures which fit about the tubes 38. The lid supports a stiff leaf spring 66 (see Fig. 6) on its inner side, and the spring contacts the top plate 68 of the roller assembly 18 (see Fig. 19). The spring 66 normally urges the lid 20 away from the roller assembly 18 into its opened position illustrated in Fig. 2, and also in the dotted lines in Fig. 5. As can be seen in Fig. 5, movement of the lid 20 results in movement of the hooked members 64.

The forward portion of the lid 20 supports a bumper guard 70 which extends forwardly. On its underside, the lid carries a latching structure which enables the lid to be latched to forward portions of the roller assembly 18 in closed position. Figs. 3 and 4 illustrate the lid latching construction in detail, and it will there be seen that an arrangement is provided wherein a pair of movable detents 72 may be moved into or out of appropriate openings formed in the forward portion of the roller assembly 18 to latch or unlatch the lid relative to the roller assembly, and that the arrangement is such that actuation of one of the detents 72 causes the other to operate through an equalizing bar arrangement.

Specifically, the detents 72 are adapted to cooperate with a pair of apertured brackets 74, one of which is shown in Fig. 3, which are mounted on opposing sides of the forward portions of the side plates 76, which form a part of the roller assembly 18 (see Fig. 5). Each of the detents 72 is mounted on a slidable bar; this can be clearly seen in Fig. 3. Each of the bars, in addition to supporting a detent 72, supports a manually engageable grip 78. As shown, the left-hand bar 80 is generally elongated and has a U-shaped end 82, one leg of which supports one of the referred-to grips and the other leg of which supports one of the referred-to detents. The leg which supports the detent is slidably mounted in a channel formed by guide bracket 84. The inner portion of the bar 80 is generally U-shaped, having a long leg 86 which is pivotally connected to one end of a pivotal link 88 by the pivot pin 90, and a short leg 92 which supports one end of a coil spring 94.

The other bar 96 has a U-shaped end 98, the legs of which support a grip and a detent in a manner similar to the first bar described. The inner end of bar 96 at a point spaced from its end is pivotally connected by the pivot pin 100 to the other end of the link 88, and the free end 102 of the bar 96 supports the other end of the spring 94. Link 88 is pivoted about a fixed point, the axis of its pivot pin 89, which is anchored to the lid 20. With the arrangement just described, pressure on either of the grips 78 will cause the bar which supports the grip to move inwardly. This movement will also cause the other bar to move inwardly through the mechanical movement, equalizing effect of the link 88. It will be understood that normally the spring 94 presses the bars apart so that the detents 72 project away from each other, and that in the closed lid position, the detents 72 are received in openings 75 in the brackets 74. In order to open the lid it is simply necessary to press either or both of the grips 78 toward the body, and this results in the detents 72 being moved inwardly toward each other and being withdrawn from the openings 75 in the brackets 74, at which time the previously mentioned spring 66 forces the lid to pivot upwardly and to open.

It will thus be seen that with the structure described so far, the lid 20 is pivotally connected to the roller assembly 18 at their rearward sides, the lid is normally urged to its open position by the spring 66, but may be closed against the pressure of said spring and latched by lid latching structure previously described in detail. It should also be apparent that the lid may be opened simply by pressing one or both grips 78 of the lid latching structure inwardly, which causes the detents 72 to withdraw from the openings 75 in brackets 74, and the lid to be snapped open by the referred-to spring 66.

The bucket 16 (see particularly Figs. 5 and 8) comprises the bottom wall 104, the side walls 106, the rear wall 108, and the front wall 110. On the rearward side of the bucket, underneath it, is mounted a pair of wheels 112 (see Fig. 5). The wheels are journaled on an axle 114 that rides in an opening 116 formed in a flange 117 which depends from the bottom wall 104, and is secured therein by a small plate 118. The wheels are mounted in a pair of recesses formed by upwardly dished portions 119 of the bottom wall 104. The mounting of the wheels is such that a certain amount of jiggling is allowed to compensate for unevenness in a surface when the machine is moved thereon.

Figure 15:
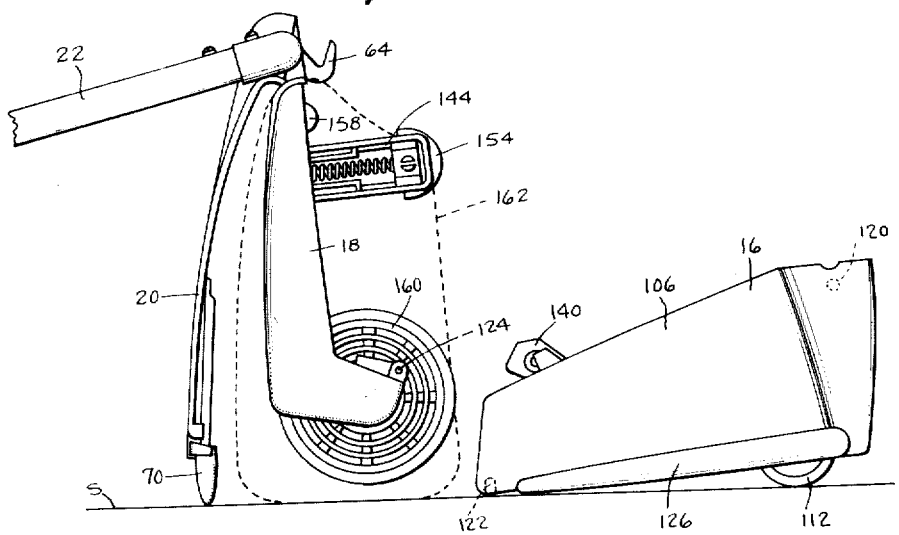
Fig. 15 is a side elevation view showing the machine in position to have its belt changed, and showing a belt schematically mounted on the roller assembly.
Figure 16:
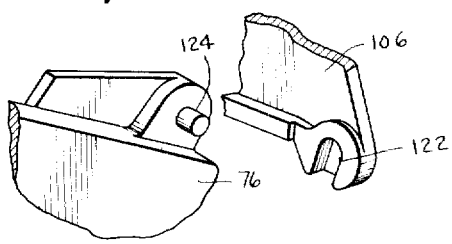
Fig. 16 is a fragmentary, perspective view of portions of the bucket and body of the machine, showing the pin and slot connection therebetween.

Within the bucket on the rear wall 108 is mounted a pair of inwardly directed, opposed pins 120. Pins 120 are spaced apart substantially the same distance as the hooked members 64 on the lid 20 are spaced apart, and the hooked portions of said members are adapted to cooperate with said pins when the roller assembly and lid are secured to the bucket. The side walls 106 of the bucket extend forwardly beyond the front wall 110, and near their forward ends have a pair of spaced, inwardly opposed, U-shaped recesses 122 (see Figs. 15 and 16). On the outer sides of the lower front portions of the side plates 76 of the roller assembly 18 are formed a pair of spaced, outwardly projecting pins 124. To assemble the bucket 16 to the roller assembly and lid, assuming the parts are in position as shown in Fig. 15, the recesses 122 are slipped over the pins 124, and the rearward portions of the roller assembly and bucket are pivoted toward each other. The hooked members 64 will clear the pins 120 and assume the dotted position shown in Fig. 5. On snapping the lid 20 closed, the hooked members 64 will pivot counterclockwise as shown in Fig. 5, and move under the pins 120 to their solid line position, and thereby lock the bucket to the remainder of the body.

It will be understood that when it is desired to separate the bucket, the reverse procedure is used, that is, the lid is unlatched by pressing grips 78 and allowed to open, thereby causing the hooked member 64 to move out from under the pins 120 formed on the bucket, and the lid and roller assembly is then pivoted forwardly until the front bumper 70 contacts the surface, as shown in Fig. 15, at which time the recesses 122 may be lifted off the pins 124. Figs. 7, 8 and 15 illustrate the body in various positions of assembly and disassembly. It will be understood that assembly and disassembly of the bucket is necessary when it is desired to charge the bucket with the material which is going to be used on the surface, as by taking it to a sink to fill it with water, or to mount, remove or change an endless belt, as will become apparent.

In order to protect furniture, a bumper guard is provided around the lower portion of the bucket 16. The guard comprises a pair of resilient L-shaped bumpers 126, one of which is mounted on each side of the bucket. Reference to Figs. 9, 10 and 11 will indicate the manner in which the bumpers are constructed and mounted on the bucket. From Fig. 9 it will be seen that a plurality of flanges 128 depend from the sides and rear walls of the bucket. The L-shaped bumpers 126, as can be seen in Fig. 10, have a groove 130 formed therein and a plurality of spaced metal clips 132 are seated in the groove. The bumpers, with their assembled clips, are forced over the flanges 128 and retained thereon by the resilience of both the clips and the resilient material of which the bumpers are made. Fig. 11 shows the parts when fully assembled.

The construction thus far disclosed relates primarily to the handle and body construction, the manner of controlling the different positions of the handle, the manner of opening and closing the lid, and the manner of assembling and disassembling the bucket to the roller assembly and the lid. The roller and endless belt arrangement will now be described in detail. The bucket 16, in addition to the structure previously described, supports a pair of rollers 134 and 136 (see Figs. 7 and 8). Roller 134 is supported near the top of rear of the side walls 106 within the bucket, whereas roller 136 is supported above and a little in front of the front wall 110. Roller 134 is supported in pivoted brackets 137, which pivot about pivot pins 139 (see Fig. 5) and are resiliently urged upwardly by coil springs 138. Roller 136 is supported on brackets 139 and has a guide plate 140 supported at each of its sides (see Fig. 8).

The roller assembly 18 includes the previously described top plate 68 and side plates 76, and the horizontally disposed, central wall 142 (see Figs. 5, 7 and 19). The side plates 76, top plate 68, and central wall 142 are assembled to form a unitary structure which supports a plurality of rollers. From Fig. 19 it will be apparent that the top plate 68 is generally triangular and that it projects from one of the side plates 76, but does not extend completely between the side plates 76. As will be apparent from Fig. 5, the top plate 68 is spaced above the central wall 142 and curved downwardly at its rearward side.

Depending below the side walls 76 near their rearward ends is a pair of brackets 144. The brackets 144 each have a slotted portion 146 having opposed guides that support a slide 148. The springs 150 are mounted in the slots and urge the slides 148 downwardly. The slides support a roller 152 between them, which in turn has a guide plate 154 at each of its ends. It will thus be seen that the roller 152 is resiliently mounted and is normally urged downwardly by the springs 150. To the rearward side of the brackets 144, extending therebetween and connected to the central wall 142 is a rigid wiping member 156. Wiping member 156 has an upwardly extending portion 157 which is adapted to contact the bottom of the belt (see Fig. 5) and wipe excess water from the belt as will subsequently become apparent. At the rear of the side plates 76, the roller 158 is secured in a conventional manner. At the forward end of the side plates 76, is supported the motor roll 160 to be subsequently described in detail. The foregoing completes the roller assembly 18, and it will be observed that it comprises a built-up, unitary assembly of plates, rollers and the main roll.

It will be observed further that when the bucket and the roller assembly and lid are separated as shown in Figs. 8 and 15, it is possible to mount a belt 162 on the machine by sliding it over one of the side plates 76 (the one that does not support top plate 68) and to force it between the central wall 142 and top plate 68 around the rollers of the roller assembly. Fig. 8 illustrates an endless belt partially mounted on the roller assembly. To remove a belt, the reverse procedure is followed.

Fig. 15 shows the machine in belt changing position, and it will there be seen that the roller assembly 18 and main roller 14 are spaced above the surface S to thereby allow for the belt to slide under these spaced parts during belt mounting and removal. The belt changing position is effected when the machine is in one of its normal erect positions by moving the handle to its carrying position, and pivoting the body forwardly about the front bumper 70 until the hand grip 26 contacts the surface. The parts of the machine are so weighted and disposed so that the parts occupy their Fig. 15 positions after the hand grip contacts the surface. When the endless belt is fully disposed about the rollers on the roller assembly, the bucket may be assembled to the roller assembly in the manner previously described. Prior to assembly of the bucket, it will be observed that the endless belt 162 will hang loosely about the rollers of the roller assembly. After the bucket is secured to the roller assembly, the rollers on the bucket and the rollers of the roller assembly cooperate to tension the belt 162. The major part of the tension is applied when the lid is snapped closed and the hooked members 64 cam the bucket into assembled position.

Fig. 5 illustrates the belt and the other parts when the belt is fully mounted, and it will there be seen that the belt 162 follows a prescribed path, in that it extends about the main motor roll 160, passes over bucket roller 136 between the guide plates 140, passes over the assembly roller 152 between the guide plates 154, passes between the bucket roller 134 and the assembly roller 158, which as will become apparent constitute squeezing rollers, passes between the central wall 142 and top plate 68 of the roller assembly, where it contacts the portion 157 of wiping member 156, and back over the main rotor roll 160. Although when fully mounted the belt is maintained in tension, there is a certain amount of resilience afforded by the presence of the springs 138 and 150.

It should be realized that the main motor roll 160 is so constructed as to drive the endless belt about the rollers in the path described in the last paragraph. When operated, some material, a solvent or a wax solution, depending upon whether cleaning or wax application is intended, may be present in the bucket 16. Therefore, it will be apparent that the endless belt, when it is driven, after contacting the surface S, will pass over roller 136 into the bucket 16 and be immersed in the material that is present therein, if there be any therein. After it comes out of the material, it passes between the rollers 134 and 158 where excess material is squeezed out and directed back into the bucket. As it passes to the rear of the roller 158, it contacts the squeegees 164 which are mounted at each front side of the rear wall 108 of the bucket, and are located above and to the rear of the roller 134 when the bucket is in assembled position (see Fig. 8). The squeegees insure that the edges of the endless belt are dry when they contact the surface by squeezing the edges further. After the belt passes the squeegees it passes over wiping member portion 157, which wipes additional material out of said belt. The squeeze rollers 134 and 158, the squeegees 164 and the wiping member portion 157 all cooperate to remove material out of the belt. It will be understood that for certain operations, such as mopping up, material may be omitted from the bucket, in which case the endless belt will be driven as usual, but will not be immersed in anything in the bucket.

Figure 14:
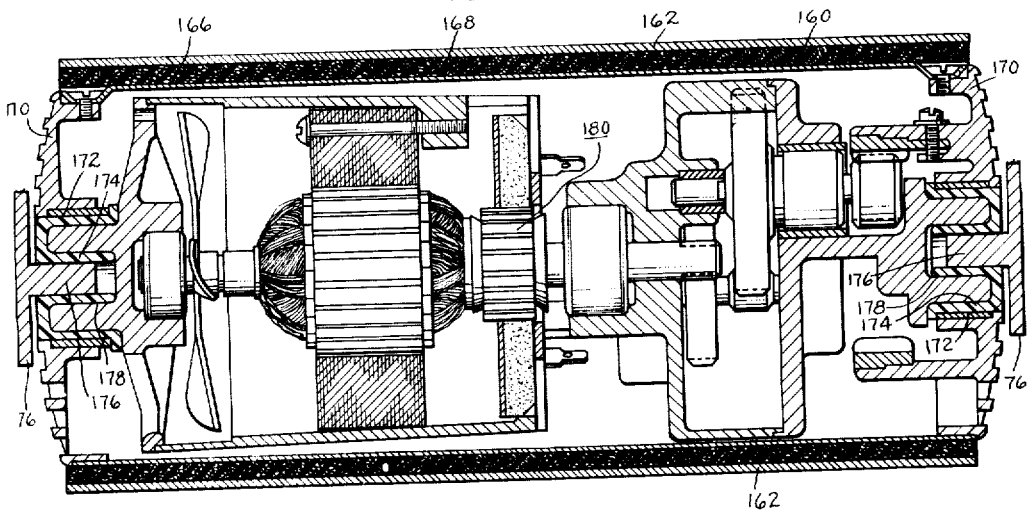
Fig. 14 is a sectional view taken substantially on line 14—14 of Fig. 1.

The construction of the main motor roll 160 will now be described in detail with particular reference to Fig. 14. The main motor roll comprises the sleeve 166 which is covered by a resilient sleeve 168 made of closed cell, cellular rubber or an equivalent material which is not affected by solvents in wax. Sleeve 166 has connected to each of its ends a slotted disk 170. The disks 170 close the ends of sleeve 166. The sleeve disks 170 have circular, central openings wherein are supported bushings 172, which in turn are mounted for rotary movement on end bearings 174. End bearings 174 are annular, cup-shaped and made of a material, such as nylon, which is both a good mechanical bearing material and a good electrical insulating material. The end bearings are rigidly secured on inwardly directed stub shafts 176 which project from forward portions of side plates 76. Each of the end bearings has an annular groove 178 formed in its inner side, which receives and rigidly supports a portion of a motor and gear reduction assembly which is designated generally as 180. The specific construction of the motor and gear reduction assembly forms no specific part of my invention and, therefore, will not be described in detail. For the purposes of this invention it is only necessary that it be understood that an electrically energized, motive power means is provided within the sleeve 166, which is appropriately connected to electrical cord 30 and is able to rotate said sleeve on the end bearings 174 at the desired speed. It is important, however, that the end bearings be of the designated material for the reason that they must support the sleeve and its disks and bushings for rotary movement thereon, and also for the reason that they must electrically isolate the motor and gear reduction assembly 180 from the remainder of the roller assembly. This is particularly important, because the machine handles liquids.

It should, therefore, be realized that the main motor roll 160 drives the endless belt 162 about the assembled and cooperating rollers of the roller assembly and the bucket, and that an arrangement has been provided wherein various types of endless belts may be utilized to perform various floor treating functions. When used as a scrubber, a scrubbing belt may be utilized with a detergent solution or solvent in the bucket 16. It will be observed that a portion of the endless belt underneath the main motor roll 160 will have line contact with the surface which it is scrubbing. If it is desired to mop or dry a wet surface, the bucket may be emptied and a clean, dry endless belt mounted and then operated to pick up any liquid that might be on the surface. If it is desired to utilize the machine as a wax applying machine, a wax impregnated endless belt may be used without any material in the bucket, or a dry belt may be used and (1) blobs of wax may be placed on the surface and then worked into the surface by the dry belt without any material in the bucket, or (2) a wax solution may be placed in the bucket. If it is desired to utilize the machine as a polisher, a buffing belt may be used to buff a previously waxed surface without any material in the bucket. It will, therefore, be observed that the machine has numerous uses as a floor treating device with or without various materials in the bucket.

It will be observed further that the improved machine has numerous functional advantages over prior art devices, and that it eliminates each of the deficiencies of the prior art devices enumerated in the introduction of this specification:

Due to the location of the motor and gear reduction assembly in the roll, substantial weight is placed over the line where the endless belt contacts the surface, and this is a desirable arrangement for it puts weight where it is useful.

Because of the construction of the roller assembly, and the manner in which the latter cooperates with the lid and bucket, it is possible to assemble or disassemble endless belts very readily. When an endless belt has been mounted on the roller assembly and the bucket attached to the roller assembly and lid, prior to closing the lid the belt is taut, but not in tension; the act of latching the lid closed, both locks the bucket onto the roller assembly and lid, and places the belt in tension and forces the squeezing rollers against each other. Conversely, unlatching the lid opens the lid and relieves the belt tension so that the bucket may be detached and the belt removed off the roller assembly.

Due to the material of which the end bearings are made, substantially the entire body is electrically insulated from the motor, resulting in a safe arrangement.

One of the outstanding attributes of the improved machine is the excellent belt tracking that is achieved. The guide plates 140 and 154, which are provided on some of the rollers, cooperate to maintain the belt in proper relationship to the rollers. The belt makes contact with the main motor roll 160 over approximately 230 to 270 degrees of the latter's circumference, and is guided by a roller shortly after it leaves the main motor roll. All of the foregoing elements cooperate to properly restrain the belt, and result in good belt tracking.

The squeeze rollers 134 and 158, the wiping member 156 and the squeegees 164 all cooperate with the belt and contribute to squeezing the belt properly and eliminating any wet edges after the belt has been dipped into the material in the bucket 16 and is about to return and pass over the main motor roll 160 and contact the surface again.

Because the main motor roll sleeve 166 is covered by a closed cell, resilient material, any irregularities in the surface may be compensated for automatically and, yet, the resilient sleeve does not absorb any of the liquid with which it is likely to come in contact during use of the machine.

Lastly, because the bucket 16 is light and detachable, it may be readily removed from the machine and carried to a sink for filling or cleaning.

The invention has been disclosed as being incorporated in a highly refined appearance design as indicated particularly in Figs. 1 and 2 of the drawings. It should be realized that the appearance design illustrated was not invented by the applicant, but rather by Messrs. A. M. Felshe and R. J. Reading, and that it is disclosed and claimed in their copending design patent application, Serial No. D. 40,064, filed February 2, 1956, which is assigned to the assignee of the instant application.

As will be evident from the foregoing description, certain aspects of my invention are not limited to the particular details of construction of the example illustrated, and I contemplate that various and other modifications and applications will occur to those skilled in the art. It is, therefore, my intention that the appended claims will cover such modifications and applications as do not depart from the true spirit and scope of my invention.

What I claim as new and desire to secure by Letters Patent of the United States is:

1. A surface treating machine comprising a roller assembly frame, a receptacle for housing liquid surface treating material supported on said frame, an endless belt, means carried by said frame for directing said belt through said receptacle and into contact with said surface, said directing means including guide means for tracking said belt comprising a plurality of pairs of spaced aligned guiding plates having opposing sides arranged to contact the edges of said belt during operation of said machine, motor powered means carried by said frame for driving said belt including a rotatable driving roller arranged to urge said belt into contact with the surface being treated, said roller being covered with a closed cell resilient covering.

2. A surface treating machine comprising a roller assembly frame, a receptacle for housing surface treating material supported on said frame, said receptacle being separable from said frame, an endless belt, motor powered means supported by said frame for driving said belt, and means for directing said belt through said receptacle and into contact with a surface to be treated, said directing means including at least one roller mounted on said frame and at least one roller mounted on said receptacle so as to be in tensioning engagement with said belt when the receptacle is supported in operative position on said frame but to be disengaged from said belt when the receptacle is separated from said frame.

3. A surface treating machine comprising a roller assembly frame, an absorbent endless belt, a receptacle for housing liquid surface treating material supported on said frame, roller means carried by said frame for directing and driving said belt through said receptacle and into contact with a surface to be treated, and means carried by said frame for removing surface treating material from the edge portions of said belt but not the major portion thereof intermediate said edge portions after it passes through material housed in said receptacle but before it contacts the surface being treated.

4. A surface treating machine comprising a handle, a body, an endless belt, said body comprising a roller assembly which is adapted to support said endless belt, a lid and a bucket, said endless belt being disposed so as to be adapted to contact a surface being treated and to pass through said bucket, said roller assembly and lid being pivotally connected thereby allowing said lid to assume either an opened or closed position relative to said roller assembly, said bucket being separable from the remainder of said body and adapted to house a surface treating material, means for latching said lid in its closed position, means for detachably connecting said bucket to the remainder of said body, said bucket connecting means comprising portions on said roller assembly and portions on said lid which coact with cooperating portions on said bucket, and means for driving said endless belt.

5. A device as defined in claim 4 wherein means is provided for urging said lid to its opened position.

6. A device as defined in claim 4 wherein said portions on said lid comprise hooked means that cooperates with some of said cooperating portions on said bucket to connect the bucket to the remainder of said body, and whereby in said hooked means locks the bucket to the remainder of said body when said lid is in closed position.

7. A device as defined in claim 4 wherein said portions on said roller assembly and some of the cooperating portions on said bucket comprise detachable pin and recess connections, said portions on said lid comprise hooked means, and the other cooperating portions on said bucket comprise projections, the arrangement being such that in order to connect the bucket to the remainder of the body, the lid must be in its open position, the pin and recess connections are made, then the hooked means are brought into close proximity to the projections on the bucket and the bucket urged against the roller assembly, and lastly, the lid is moved to closed position and latched, thereby causing said hooked means to contact said projections and cam the bucket against the remainder of the body.

8. A device as defined in claim 4 wherein said endless belt is mounted on said roller assembly and is maintained in tension when said lid is in closed position and said bucket is connected to the remainder of said body, and wherein said belt is slack when said lid is in opened position and said bucket is separated from the remainder of said body, said lid has a portion that extends forwardly beyond the rest of said body, and said handle is connected to said lid and roller assembly and adapted to assume a position wherein it is tilted forwardly relative to said body and is immovable relative thereto, whereby said endless belt may be mounted on or removed from said roller assembly by opening said lid, disposing said handle in said position, and tipping the machine forwardly so that it pivots on said extending lid portion until the free end of said handle contacts the surface, when the latter occurs, the bucket may be separated from the rest of the body and the roller assembly is spaced above the surface to allow the endless belt to be slid onto or off of said roller assembly.

9. A device as defined in claim 4 wherein said belt is adapted to be mounted on said roller assembly, said roller assembly includes a squeeze roller, and said bucket includes a roller, whereby said bucket roller is adapted to be urged toward said squeeze roller when said bucket is connected to the remainder of said body to thereby squeeze the portion of said belt that is disposed between said rollers.

10. A device as defined in claim 9 wherein said belt is slack when said lid is in opened position and said bucket is separated from the remainder of said body, and wherein connection of said bucket to the remainder of said body and latching of said lid in closed position causes said belt to be placed in tension and said rollers to be urged toward each other.

11. A device as defined in claim 4 wherein said handle is mounted so as to be selectively positioned in any one of three general positions: a carrying position, wherein it is generally vertical, but tilted forwardly; an operating position, wherein it is tilted backwardly; and an under furniture position, wherein it is generally horizontal.

12. A surface treating machine comprising a receptacle for housing a surface treating material, an endless belt, powered means for driving said belt, means for directing said belt through said receptacle and into contact with said surface, a handle for maneuvering said machine over said surface, and means for pivotally connecting said handle to said machine, said last-named means comprising a cam having a cam surface, a lever having a projecting portion adapted to cooperate with said cam surface, and a manually operable member for actuating said lever whereby said projecting portion cooperates with said cam surface to determine the position of said handle relative to said machine, and said lever is pivotally mounted and adapted to withdraw said projecting portion from said cam surface to thereby allow adjustment of the handle, said handle being adapted to be selectively positioned in any one of three general positions: a carrying position, wherein it is generally vertical, but tilted forwardly; an operating position, wherein it is tilted backwardly; and an under furniture position, wherein it is generally horizontal.

References Cited in the file of this patent

UNITED STATES PATENTS

| | | |
|---|---|---|
| 532,020 | Brightman | Jan. 8, 1895 |
| 1,000,699 | Seyferth | Aug. 15, 1911 |
| 1,356,337 | Clarke | Oct. 19, 1920 |
| 1,462,145 | Murray | July 17, 1923 |
| 1,773,077 | Newman | Aug. 12, 1930 |
| 1,858,666 | Gilmer | May 17, 1932 |
| 1,882,270 | Beach | Oct. 11, 1932 |
| 2,190,376 | Daley | Feb. 13, 1940 |
| 2,202,979 | Becker | June 4, 1940 |
| 2,215,692 | Fleming | Sept. 24, 1940 |
| 2,280,867 | Swan | Apr. 28, 1942 |
| 2,297,107 | Magnuson | Sept. 12, 1942 |
| 2,313,606 | Webb et al. | Mar. 9, 1942 |
| 2,528,870 | Detweiler | Nov. 7, 1950 |

FOREIGN PATENTS

| | | |
|---|---|---|
| 22,695 | Australia | Sept. 27, 1929 |

OTHER REFERENCES

Product Engineering Publication, July, 1950, pp. 102–105.